April 16, 1968  H. FROITZHEIM ET AL  3,378,278
STEP UNIT FOR DRIVER CAB OF MOTOR VEHICLES
Filed Aug. 4, 1965  3 Sheets-Sheet 2

INVENTORS
HANS FROITZHEIM
KARL LETZEL

BY Dicke & Craig

ATTORNEYS

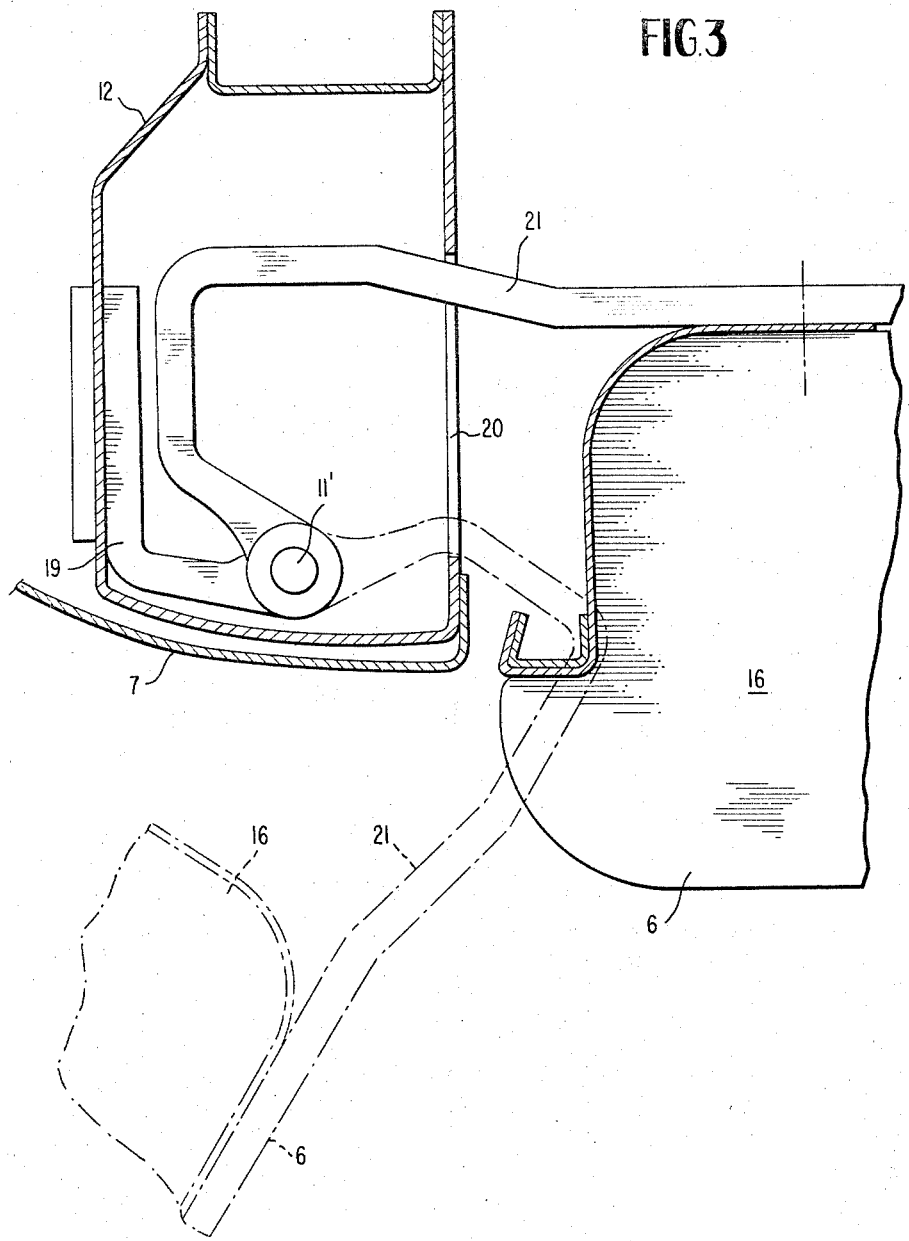

United States Patent Office 3,378,278
Patented Apr. 16, 1968

3,378,278
STEP UNIT FOR DRIVER CAB OF
MOTOR VEHICLES
Hans Froitzheim and Karl Letzel, Sindelfingen, Wurttemberg, Germany, assignors to Daimler-Benz Aktiengesellschaft, Stuttgart-Unterturkheim, Germany
Filed Aug. 4, 1965, Ser. No. 477,105
Claims priority, application Germany, Aug. 11, 1964,
D 45,160
8 Claims. (Cl. 280—163)

ABSTRACT OF THE DISCLOSURE

A step arrangement for providing access to the cab or driver compartment, especially of commercial-type motor vehicles with the cab located above the wheels thereof, which is constructed as a pivotal or hinged cover for a space below the driver's cab.

The present invention relates to a step arrangement for the cab or driver compartment, especially of commercial type motor vehicles, which is constructed as pivotal or hinged cover for a space containing the engine or other aggregates or units necessary for the driving operation of the vehicle, which space is rendered accessible by pivotal opening of the cover, as described in our copending application Ser. No. 293,488 filed on July 8, 1963, and entitled "Motor Vehicle Construction." The contents of the aforementioned copending application are incorporated herein by reference to the extent necessary.

The present invention, for purposes of facilitating the servicing and repair work, aims at utilizing to the greatest possible extent the inside height below the floor of the driver cab, whereby the free accessibility for these operations and labors also is not impaired with vehicles having laterally projecting fenders. This achieved in accordance with the present invention in that the step structure is pivotally supported by means of superposed hinges about a vertical axis below the boarding or ingress opening of the driver cab and is suspended in such a manner as to be adapted to be locked to a fixed or stationary vehicle part. The step unit is thereby advantageously arranged between the forward corner column of the driver cab and the fender that the hinge axis extends at the forward, approximately vertical frame member of the step unit along the forward corner column of the driver cab and the locking means is arranged at a forward part of the fender forming the rear frame member of the step unit.

Accordingly, it is an object of the present invention to provide a step unit for the driver cab of a motor vehicle which is simple in construction and safe in operation yet allows ready access to the engine and/or other drive units and control devices located below the floor of the driver cab.

Another object of the present invention resides in a sturdy step structure pivotally secured below the ingress opening of the driver cab of a modern commercial type motor vehicle which greatly facilitates the accessibility of the drive unit and/or other aggregates located below the floor of the driver cab.

A further object of the present invention resides in a step structure in the external body walls of the driver cab of a motor vehicle, below the floor of the driver cab and forwardly of the fender, which not only produces a pleasing and aesthetic appearance of the vehicle, blending into the general neat contour of the vehicle body but also minimizes the number of parts without impairing either the accessibility to the engine compartment or the freedom of use of laterally projecting fenders for the front wheels.

Still a further object of the present invention resides in the provision of a unitary step structure which is sturdy, can be readily manufactured at relatively low cost and can also be readily secured at the vehicle without impairing the accessibility to the engine compartment.

These and other objects, features and advantages of the present invention will become more obvious from the following description when taken in connection with the accompanying drawing which shows, for purposes of illustration only, one embodiment in accordance with the present invention, and wherein:

FIGURE 3 is a partial cross-sectional view, on an enlarged scale, taken along line III—III of FIGURE 1.

Figure 1:
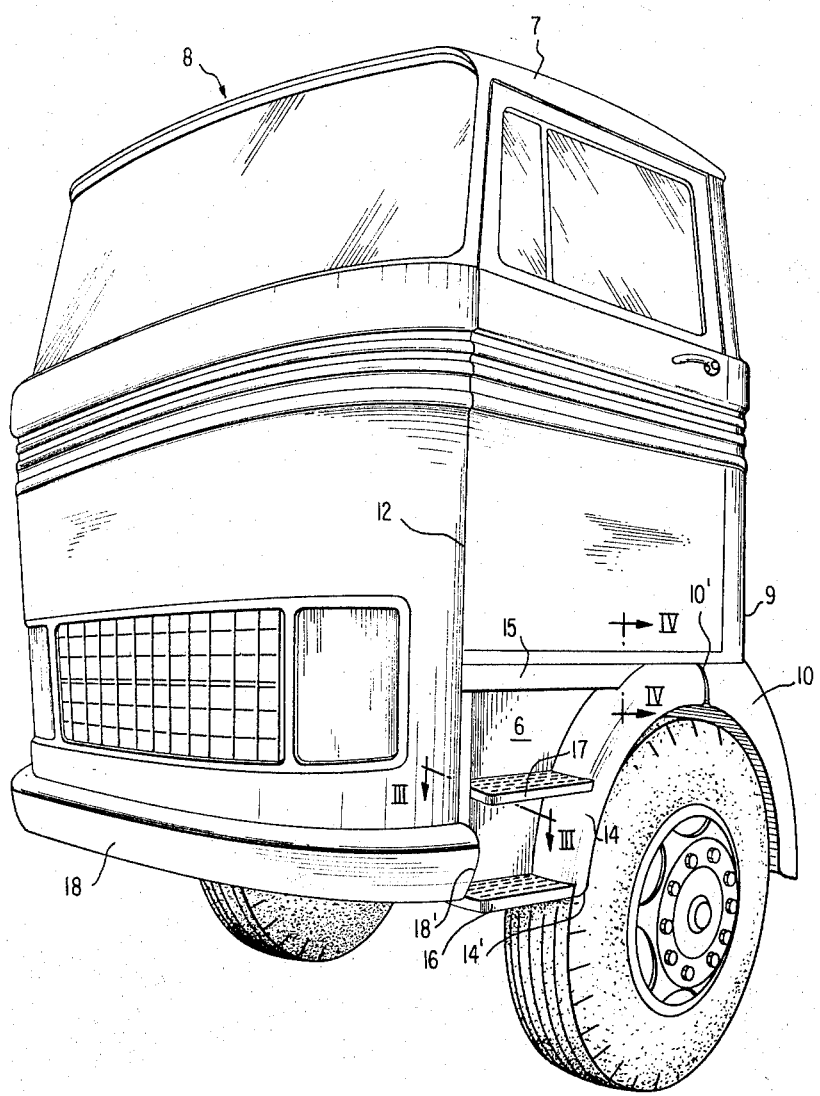
FIGURE 1 is a perspective view of a driver cab with a step unit swung into the normal position thereof.
Figure 2:
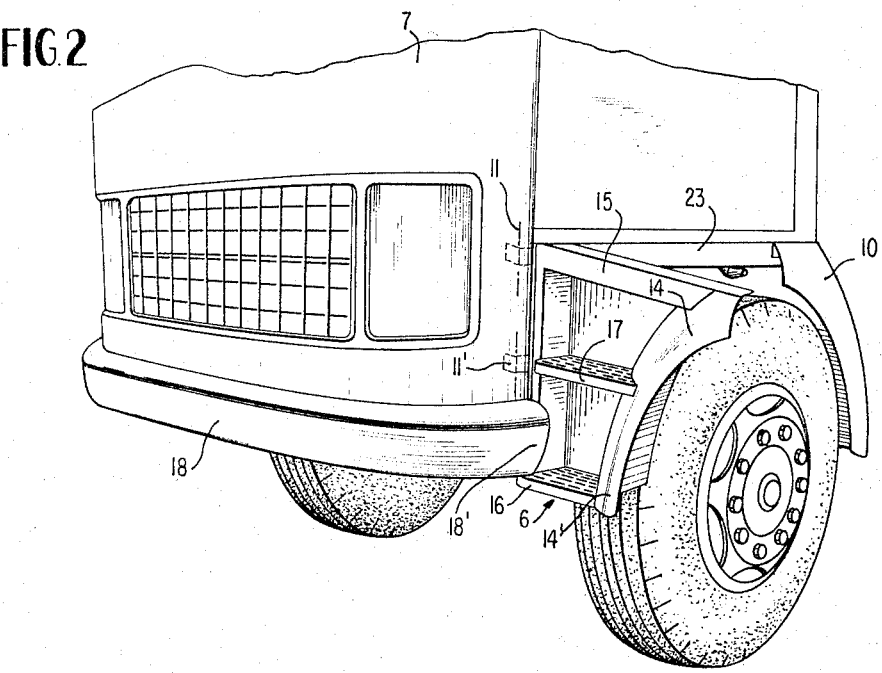
FIGURE 2 is a partial perspective view, similar to FIGURE 1, with the step unit in a swung-out condition.

Referring now to the drawing wherein like reference numerals are used throughout the various views to designate like parts, and more particularly to FIGURE 1, reference numeral 6 generally designates therein the step unit of the driver cab 7 of a modern commercial type motor vehicle, generally designated by reference numeral 8 which is of the type having a short or no hood or of the type with a cab over the front wheels. In such types of vehicles, the step unit 6 is flush with the lateral walls 9 of the driver cab 7 where it is arranged in the lower part of the driver cab 7 in front of the fender 10 and extends to the transverse front wall of the driver cab 7. The step unit 6 is suspended at the forward driver cab column 12 by means of superposed hinges 11 and 11' to be laterally pivotal about a forward vertical axis (FIGURES 2 and 3). The upper joint or hinge 11 is arranged below the driver cab floor 13, approximately at the height of the top 10' of the fender 10 and the lower joint 11' is arranged at some distance below the hinge 11, approximately at half the arcuate height of the fender 10. The step unit 6 can be pivoted or swung forwardly in the outward direction through an angle somewhat larger than a right angle by means of the hinges 11 and 11' (FIGURE 2). The step unit 6 is rigidly connected with the forward half 14 of the fender 10, subdivided approximately at the height of its top so that the forward fender half 14 forms the rear frame member of the step unit 6 which is thereby reinforced in a frame- or box-like manner.

The upper cross member 15 of the step unit 6 is flush with the remaining lateral wall 9 of the driver cab whereas the two steps 16 and 17 are set back with respect to the lateral wall 9 within the area of the forward lower part thereof. The lower step 16 is arranged at a height suitable for boarding and is securely connected with the forward lower end 14' of the forward fender part 14. The upper step 17 is disposed above the forward bumper 18 at the height of the lower hinge 11' and may be rigidly connected with the movable hinge part of the lower hinge 11'. In order to utilize in as far-reachingly as possible a manner the space available for the outward pivotal movement of the step unit, the arrangement is made in accordance with the present invention in such a manner that with the step unit 6 completely swung-out the lateral bumper end 18' extends into the space between the step 16 and 17 (FIGURE 2). As a result of the lateral pivot movement of the step unit 6 together with the forward fender part 14 through an angle in excess of 90°, a sufficiently large undisturbed opening area for the necessary service and repair work is obtained.

With both hinges 11 and 11', the approximately angularly constructed fixed hinge tie or strip 19 (FIGURE 3) is secured within the forward driver cab colume 12 open toward the outside through an opening 20 of the column 12 whereby they carry at the outer ends thereof the step unit 6.

Figure 4:
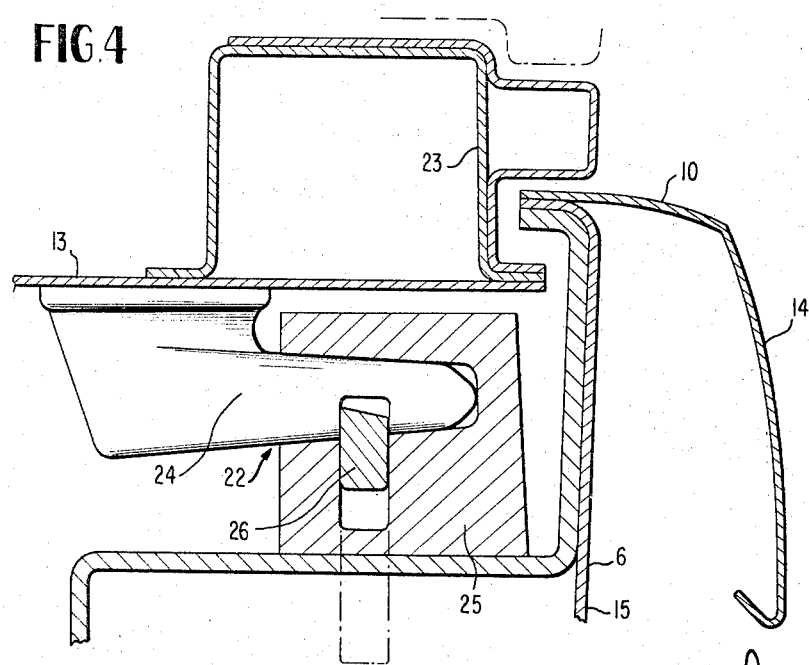
FIGURE 4 is a partial cross-sectional view, on an enlarged scale, taken along line IV—IV of FIGURE 1.

Since both hinges 11 and 11', by reason of the spatially crowded conditions in the vehicle, have, as a rule, only a relatively slight spacing from one another, it is appropriate to provide a locking means generally designated by reference numeral 22 (FIGURE 4) adapted to be locked or closed against an unintentional opening of the step unit 6. For that purpose, a pin-type latching means provided with a pin 24 (FIGURE 4) is arranged at the threshold bearer member 23, preferably opposite the hinge axis and approximately in the neighborhood of the forward fender part 14, while the associated locking sleeve 25 of the locking means 22 is arranged at a corresponding height on the step unit 6. Of course, it is within the scope of the present invention to provide a reverse arrangement, i.e., reversing the pin 24 and sleeve 25 in relation to the associated parts. The locking by means of a pin or other type locking mechanism simultaneously serves to help carry the step unit load i.e., for assisting the hinges 11 and 11', especially if the step is loaded by the weight of heavily loaded drivers or assembly workers.

The locking or latch member 26 of the pin-type lock means 22 is automatically bolted, or locked, for example, by a conventional spring-loaded, pivotal slide member (not shown), against unintentional opening so that for each opening of the step 6, the slide member (not shown) has to be manually displaced against the spring pressure for the release of the pin 24, possibly by means of a Bowden cable or the like. In lieu of the pin-type locking device, any other closure or locking mechanism may be used which is adapted to be locked or bolted and rapidly releasable, for example, a latch-type lock, a bolt-type lock and the like.

Owing to the lateral pivot movement of the step unit 6 in accordance with the present invention, the full inside height below the boarding opening of the driver cab or below the floor within the area of the step unit is freely accessible independently of the flush or suitably projecting fender arrangement. Furthermore, the swung-open step unit 6 does not project laterally beyond the vehicle lateral wall a greater distance than the space required adjacent the vehicle by a person ready to board the vehicle.

While we have shown and described one embodiment in accordance with the present invention, it is understood that the same is not limited thereto but is susceptible of numerous changes and modifications as known to a person skilled in the art and we therefore do not wish to be limited to the details shown and described herein but intend to cover all such changes and modifications and are encompassed by the scope of the appended claims.

We claim:

1. A step unit for the driver cab of a motor vehicle having a boarding opening and door means for the closure thereof, especially of a commercial type motor vehicle provided with a space which is rendered accessible by the step unit, comprising:
   step means constructed as pivotal cover structure for said space rendered accessible by pivoting said cover and containing units necessary for the operation of the vehicle, said step means being pivotable independently of said door means,
   means including superposed hinge means for pivotally suspending said step means at the vehicle below the boarding opening of the driver cab about a substantially vertical axis,
   and locking means for locking said step means at a fixed vehicle part.

2. A step unit for the driver cab of a motor vehicle, especially of a commercial type motor vehicle provided with a space which is rendered accessible by the step unit, comprising:
   step means constructed as pivotal cover structure for said space rendered accessible by pivoting said cover and containing units necessary for the operation of the vehicle,
   means including superposed hinge means for pivotally suspending said step means at the vehicle below the boarding opening of the driver cab about a substantially vertical axis,
   said driver cab having lateral walls, said step means being provided with at least one step, said at least one step being recessed with respect to said lateral walls, the outer edges of each step being approximately flush with said lateral walls,
   and the hinge axis of said hinge means extending substantially in the direction of the inclination of the lateral walls of the driver cab.

3. A step unit for the driver cab of a motor vehicle, especially of a commercial type motor vehicle provided with a space below the driver cab and having lateral body wall and corner column means for the driver cab, bumper means and fender means for the front wheels, comprising:
   step means having steps and constructed as pivotal cover structure for said space located below the driver compartment in the driver cab, said space being rendered accessible by pivoting said cover and containing units necessary for the operation of the vehicle,
   means including superposed hinge means for pivotally suspending said step means at the vehicle below the boarding opening of the driver cab about a substantially vertical axis,
   and locking means for locking said step means at a fixed vehicle part,
   said step means including an approximately vertical forward frame member and a rear frame member, the hinge axis extending at said forward frame member along the forward column means of the driver cab, and the locking means being arranged at a front part of the respective fender means forming simultaneously the rear frame member of the step means, the lateral end of said bumper means extending into the space between the steps of the step means with said step means laterally pivoted into the open position thereof.

4. A step unit for the driver cab of a motor vehicle having a boarding opening and door means for the closure thereof, especially of a commercial type motor vehicle provided with a space which is rendered accessible by the step unit, comprising:
   step means constructed as pivotal cover structure for said space rendered accessible by pivoting said cover and containing units necessary for the operation of the vehicle,
   means including superposed hinge means for pivotally suspending said step means at the vehicle below the boarding opening of the driver cab about a substantially vertical axis,
   and locking means for locking said step means at a fixed vehicle part, and
   loading bearing means forming a door sill for driver cab, said door sill positioned in a horizontal plane between said door means and said step means.

5. A step unit according to claim 1, wherein
   said locking means includes detent means operable to automatically lock said step means upon return to the normal position thereof.

6. A step unit according to claim 1, wherein
   the hinge axis of said hinge means extends substantially in the direction of the inclination of the lateral walls of the driver cab,
   said locking means including a pin-type locking device having pin and locking sleeve means and detent means operable to lock said pin means automatically upon pivoting the step means into the normal position thereof in the vehicle, and further comprising:

manually operable means for releasing said detent means.

7. A step unit for the driver cab of a motor vehicle, especially of a commercial type motor vehicle, provided with a space below the driver cab and having lateral body wall and corner column means for the driver cab, said lateral body wall and said corner column means defining a boarding opening therebetween, door means for the closure of said boarding opening, bumper means, and fender means for the front wheels, comprising:

step means having steps and constructed as pivotal cover structure for said space located below the driver compartment in the driver cab, said space being rendered accessible by pivoting said cover and containing units necessary for the operation of the vehicle, means including superposed hinge means for pivotally suspending said step means at the vehicle below the boarding opening of the driver cab about a substantially vertical axis, and locking means for locking said step means at a fixed vehicle part, the hinge axis of said hinge means extending substantially in the direction of the inclination of the lateral walls of the driver cab, said step means including an approximately vertical forward frame member and a rear frame member, the hinge axis extending at said forward frame member along the forward column means of the driver cab, and the locking means being arranged at a front part of the respective fender means forming simultaneously the rear frame member of the step means, said locking means including a pin-type locking device having pin and locking sleeve means and detent means operable to lock said pin means automatically upon pivoting the step means into the normal position thereof, in the vehicle, and manually operable means for releasing said detent means, the lateral end of the front bumper means extending into the space between the steps of the step means with the step means laterally pivoted into the open position thereof.

8. A step unit for the driver cab of a motor vehicle, especially of a commercial type motor vehicle provided with a space below the driver cab and having lateral body wall and corner column means for the driver cab and bumper means, comprising:

step means including steps and constructed as a pivotal cover structure for said space located below the driver compartment in the driver cab, said space being rendered accessible by pivoting said cover and containing units necessary for the operation of the vehicle, means including superposed hinge means for pivotally suspending said step means from the vehicle below the boarding opening of the driver cab about a substantially vertical axis, and locking means for locking said step means at a fixed vehicle part, said step means including an approximately vertical forward frame member and a rear frame member, the hinge axis extending at said forward frame member along the forward column means of the driver cab, the lateral end of said bumper means extending into the space between the steps of the step means with said step means laterally pivoted into the open position thereof.

References Cited
UNITED STATES PATENTS

| 1,795,208 | 3/1931 | Garner | 296—1 |
| 3,055,699 | 9/1962 | May | 296—28 |
| 3,224,525 | 12/1965 | Froitzheim et al. | 280—166 |

LEO FRIAGLIA, *Primary Examiner.*

MILTON BUCHLER, *Examiner.*

L. D. MORRIS, *Assistant Examiner.*